United States Patent [19]
Brown et al.

[11] Patent Number: 6,073,137
[45] Date of Patent: Jun. 6, 2000

[54] METHOD FOR UPDATING AND DISPLAYING THE HIERARCHY OF A DATA STORE

[75] Inventors: Alon A. Brown, Bellevue; Scott A. Thurlow, Kirkland; Stephen T. Wells, Seattle, all of Wash.

[73] Assignee: Microsoft, Redmond, Wash.

[21] Appl. No.: 08/962,498

[22] Filed: Oct. 31, 1997

[51] Int. Cl.⁷ .................................................. G06F 17/30
[52] U.S. Cl. ........................ 707/104; 707/100; 707/102; 707/8
[58] Field of Search ................. 707/10, 4, 200, 707/203, 1, 100, 8, 104; 395/200.46, 156, 344, 200.34, 653, 200.47, 200.53; 345/340, 353, 333; 709/219

[56] References Cited

U.S. PATENT DOCUMENTS

| | | | |
|---|---|---|---|
| 5,423,034 | 6/1995 | Cohen-Levy et al. | 707/10 |
| 5,485,175 | 1/1996 | Suzuki | 395/156 |
| 5,588,107 | 12/1996 | Bowden et al. | 395/344 |
| 5,771,381 | 6/1998 | Jones et al. | 395/653 |
| 5,778,383 | 7/1998 | Grisar et al. | 707/200 |
| 5,787,417 | 7/1998 | Hargrove | 707/4 |
| 5,793,970 | 8/1998 | Fakes et al. | 395/200.46 |
| 5,801,702 | 9/1998 | Dolan et al. | 345/353 |
| 5,809,242 | 9/1998 | Shaw et al. | 395/200.47 |
| 5,812,773 | 9/1998 | Norin | 395/200.34 |
| 5,819,295 | 10/1998 | Nakagawa et al. | 707/203 |
| 5,838,319 | 11/1998 | Guzak et al. | 345/340 |
| 5,848,410 | 12/1998 | Walls et al. | 707/4 |
| 5,878,421 | 3/1999 | Ferrel et al. | 707/100 |
| 5,890,147 | 3/1999 | Peltonen et al. | 707/1 |
| 5,905,492 | 5/1999 | Straub et al. | 345/333 |
| 5,905,866 | 5/1999 | Nakabayashi et al. | 395/200.53 |

OTHER PUBLICATIONS

Gavron et al., "How to use Microsoft Windows NT 4 Workstation", Macmillan Computer Publishing, 1996, pp. 33–43.

Crispin, M., "Internet Message Access Protocol—Version 4rev1 (RFC2060)", Dec. 1996.

*Primary Examiner*—Wayne Amsbury
*Assistant Examiner*—Thuy Pardo
*Attorney, Agent, or Firm*—Jones & Askew, LLP

[57] ABSTRACT

A method for efficiently updating and displaying the hierarchy of a remote data store and displaying subfolder indicia indicating that child folders contain at least one subfolder. When a user expands a folder, an e-mail client displays a cached list of the expanded folder's contents. After the cached data is displayed, a list of the expanded folder's child folders and a list of the subfolders contained in the child folders are retrieved from the remote mail server. The retrieved data is sorted and compared to the cached list, and the cached data is updated to reflect the correct child folders and whether the child folders contain subfolders. The displayed hierarchy is then updated to reflect the state of the data that was retrieved from the server.

22 Claims, 4 Drawing Sheets

METHOD FOR UPDATING AND DISPLAYING THE HIERARCHY OF A DATA STORE

TECHNICAL FIELD

The present invention relates to methods for displaying the hierarchy of a data store, such as a file store or message store, and more particularly relates to an improved method for updating and displaying a cached copy of the hierarchy associated with a remote data store.

BACKGROUND OF THE INVENTION

Microsoft Corporation's "WINDOWS 95" operating system introduced a component called the Windows Explorer, which provides an effective way to view the hierarchy of folders and subfolders associated with a file store. The Windows Explorer user interface (UI) allows a user to view a list of folders and immediately determine whether each folder includes subfolders. This is accomplished by displaying a "+" next to unexpanded folders that include subfolders and a "−" next to expanded folders that include subfolders. No special indicia are displayed next to folders that do not include subfolders.

In some electronic messaging systems, the message stores employ hierarchies that are similar to a typical file store. In these systems, a user may create a hierarchy of folders that include subfolders or message items or both. This allows a user to effectively organize and manage his or her mailbox by filing each electronic message in an appropriate folder.

The Internet Message Access Protocol (IMAP) is an example of a messaging protocol that supports these types of message store hierarchies. IMAP defines a method of accessing electronic mail or bulletin board messages that are kept in a message store on a remote mail server. IMAP permits an e-mail client program to access remote message stores as if they were local. Messages stored on an IMAP server can be easily manipulated by a user who uses multiple computers (e.g., a workstation at the office and a notebook on the road) without requiring the user to transfer messages or files back and forth between his or her computers.

Where message stores employ hierarchies that are similar to other types of file stores, it is preferable to use a consistent user interface to display these hierarchies. This is advantageous because the most effective user interface can be employed in both contexts and the user does not have to become familiar with multiple methods of displaying similar information. However, when attempting to display hierarchies stored in remote data stores, which include file stores and message stores, the goal of providing useful information in a consistent user interface may conflict with considerations regarding response time and bandwidth.

Current IMAP e-mail client programs download the message hierarchy from the server in one of two ways. Most IMAP clients download the entire hierarchy at one time, usually during boot up. Depending on the size of the hierarchy, this can be very time consuming and require a lot of bandwidth. In order to update the display, the client must download the entire hierarchy again. Other IMAP clients conserve bandwidth by retrieving only one level of the hierarchy at a time in response to user demand (e.g., expanding a folder).

Although downloading the hierarchy one level at a time allows the e-mail client to display the current level of the hierarchy and conserves bandwidth, it does not allow the e-mail client to indicate whether each displayed folder includes subfolders. In order to display a "+" or other indicia indicating the presence of subfolders, the e-mail client must also retrieve information regarding the contents of the displayed subfolders. Downloading the entire hierarchy each time a folder is expanded provides the required information and allows the e-mail client to accurately display the hierarchy using a Windows Explorer-type UI. However, downloading the entire hierarchy may require a significant amount of bandwidth and result in an unacceptable response time.

Therefore, there is a need in the art for an improved method for updating and displaying a remote data store's hierarchy. The improved method should allow an e-mail client or other client application to indicate whether each displayed folder includes subfolders and should minimize both the response time and the amount of bandwidth required to transfer the hierarchy information.

SUMMARY OF THE INVENTION

The present invention satisfies the above-described needs by providing an improved method for updating and displaying the hierarchy of a remote data store. The method allows a client application, such as an e-mail client, to efficiently retrieve sufficient information to display both the contents of an expanded folder and an indication as to whether the displayed folders include subfolders. This allows efficient evaluation and traversal of the data store hierarchy while minimizing both response time and bandwidth requirements.

Generally described, the present invention provides a method for retrieving and displaying the contents of a folder that is stored in a remote data store. The method includes receiving an indication to expand the folder and displaying locally cached contents of the folder. First and second levels of the folder's current contents are then retrieved from a remote server. The first level includes "child folders" of the expanded folder and the second level includes "subfolders" of the child folders. The cached contents of the folder are updated to reflect the current contents of the folder, which were retrieved from the data store. The updated cached contents of the folder are then displayed along with subfolder indicia that are displayed in association with child folders that include subfolders.

In another aspect, the present invention provides a computer-readable medium having computer executable instructions. When executed by a computer, the instructions perform the steps of caching the contents of a folder stored in a remote message store. Upon receiving an indication to expand the folder, the cached contents of the folder are displayed. The instructions also include retrieving from the message store a list of the folder's child folders and a list of the child folders' subfolders. The cached contents of the folder are updated to reflect the current contents of the folder, which were retrieved from the message store. The current contents of the folder are displayed along with subfolder indicia, which are displayed in association with child folders that include subfolders.

The various aspects of the present invention may be more clearly understood and appreciated from a review of the following detailed description of the disclosed embodiments and by reference to the appended drawings and claims.

DETAILED DESCRIPTION

Figure 1:
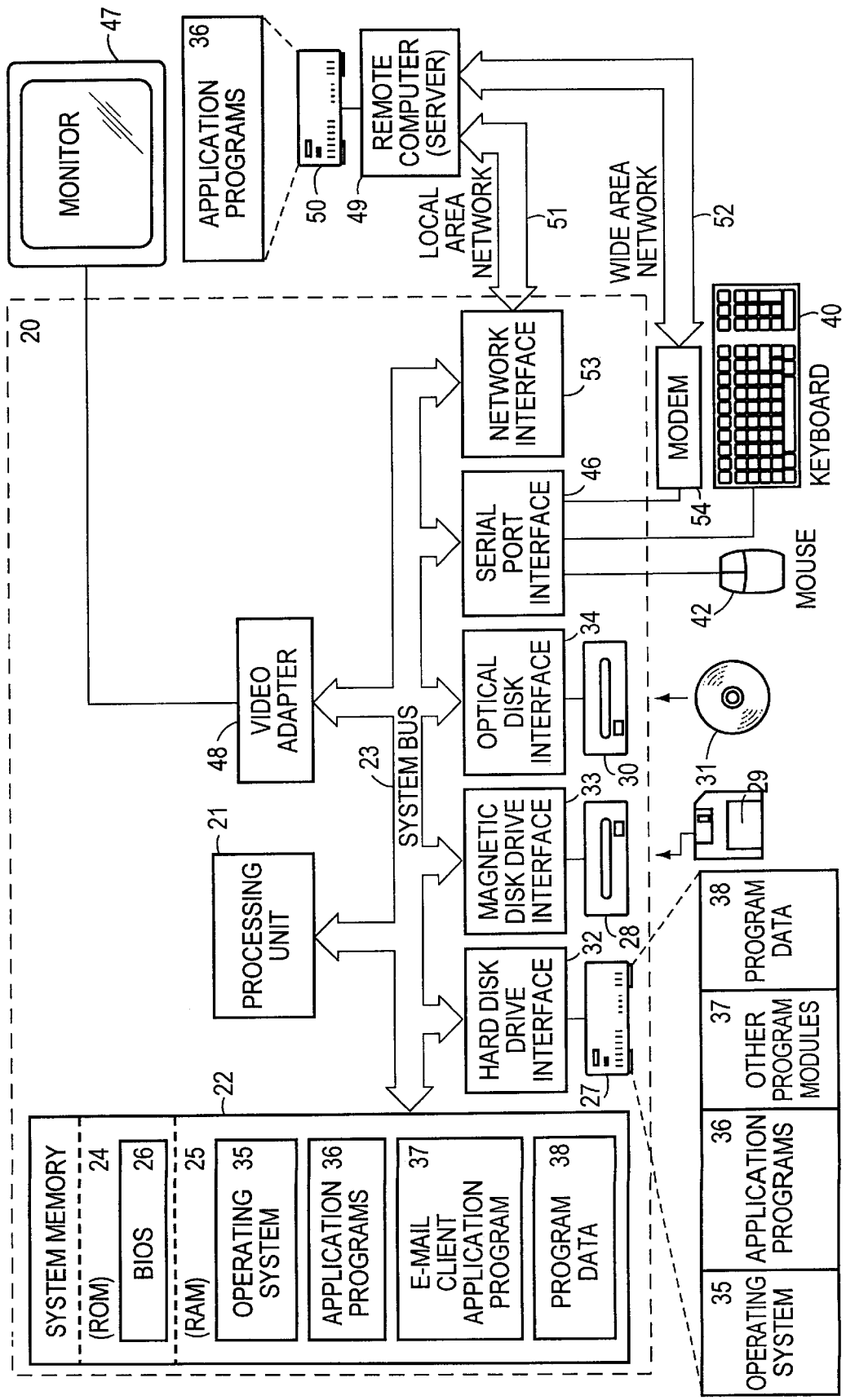
FIG. 1 is a block diagram of a personal computer that provides the operating environment for an embodiment of the present invention.

The present invention is directed to an improved method for updating and displaying the hierarchy of a remote data store. In an exemplary embodiment, the method responds to a user expanding a folder by first displaying a cached copy of the hierarchy information. After the cached data is displayed, a list of the expanded folder's child folders and a list of the subfolders contained in the child folders are retrieved from the retrieved data store. The retrieved data is sorted and compared to the cached data, and the cached data is updated to reflect the correct child folders and whether the child folders contain subfolders. The displayed hierarchy is then updated to reflect the retrieved data. In one embodiment, the invention may be used to display information pertaining to a remote message store. An exemplary embodiment allows an e-mail client to efficiently download sufficient information to maintain accurate information regarding subfolders and to allow efficient traversal of an IMAP hierarchy using a Windows Explorer-style user interface.

Referring now to the drawings, in which like numerals represent like elements throughout the several figures, aspects of the present invention and an exemplary operating environment will be described.

EXEMPLARY OPERATING ENVIRONMENT

FIG. 1 and the following discussion are intended to provide a brief, general description of a suitable computing environment in which the present invention may be implemented. While the invention will be described in the general context of an application program that runs under an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35 (e.g., Microsoft Corporation's "WINDOWS 95" operating system), one or more application programs 36, an e-mail client application program 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a mail server (which includes one or more message stores), a file server (which includes one or more file stores), a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

UPDATING AND DISPLAYING A MESSAGE STORE'S HIERARCHY

An exemplary method for updating and displaying the hierarchy of a remote message store is illustrated in FIGS.

2–4. This exemplary embodiment of the present invention is embodied in the "MICROSOFT OUTLOOK '98" application program, which is published by Microsoft Corporation of Redmond, Washington. The "MICROSOFT OUTLOOK" program manages e-mail, calendars, contacts, tasks and to-do lists, and documents or files on a hard drive. The program helps users communicate through e-mail, phone support and group scheduling capabilities, and allows users to create and view information using a consistent interface. The "MICROSOFT OUTLOOK" program supports the Internet Message Access Protocol (IMAP). IMAP is described in variety of documents, including RFC 2060, which is published by the University of Washington, and which is incorporated herein by reference.

Figure 2A:
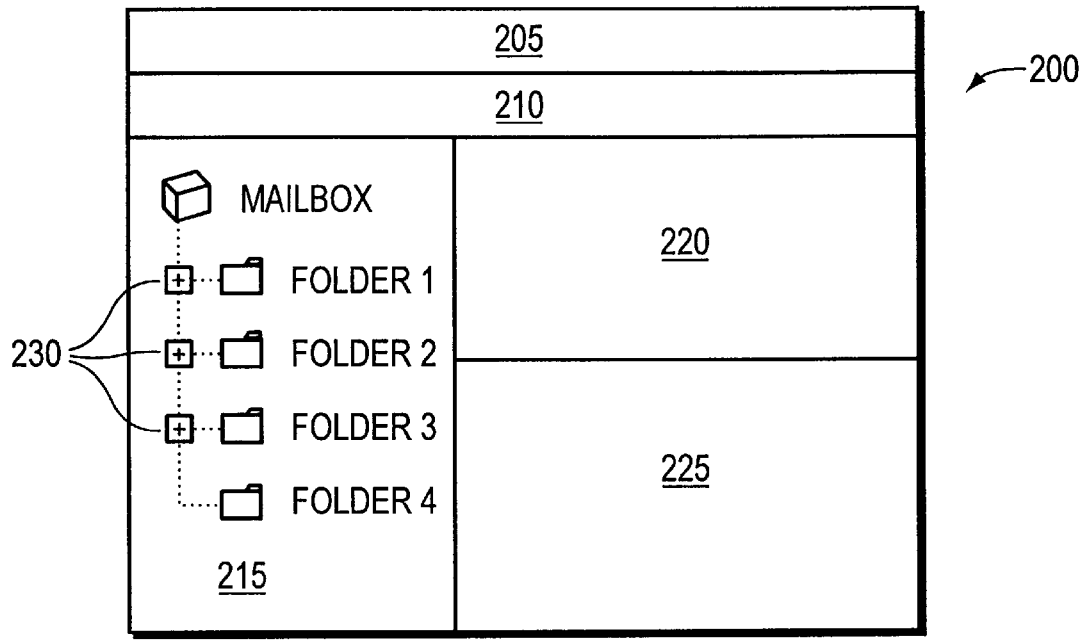
FIG. 2, consisting of FIGS. 2a and 2b, illustrates display screens for displaying a data store hierarchy along with indicia that indicate whether the displayed folders contain subfolders.
Figure 2B:
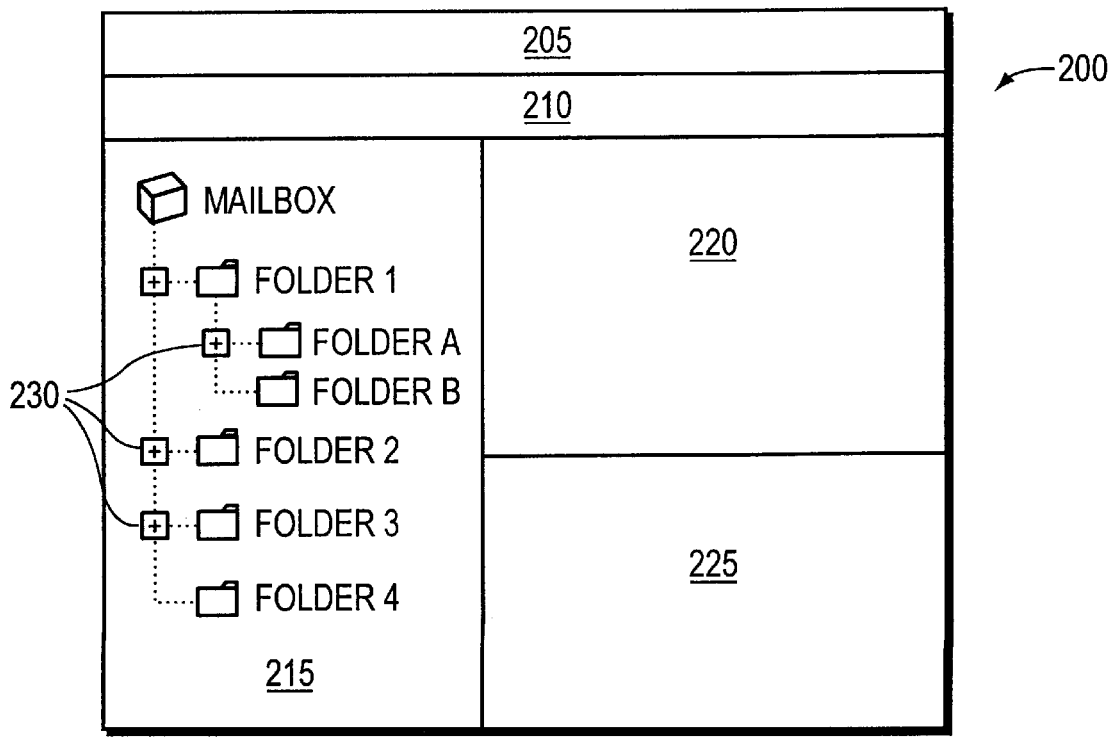

FIGS. 2a and 2b, collectively referred to as FIG. 2, illustrate the Windows Explorer-like user interface that is used to display information regarding the data store hierarchy. FIGS. 2a and 2b both illustrate a program window 200. The top portion of the window 200 includes a menu bar 205 and a toolbar 210, which will be familiar to those skilled in the art. The bottom portion of the window 200 is divided into three separate areas. Generally described, the left area 215 is used to display the hierarchy of folders on the data store. When a user selects a folder in the left area 215, the contents of the folder, including both subfolders and message items, are displayed in the top right area 220. When a user selects a message item from the list in the top right area 220, the contents of the message item are displayed in the bottom right area. 225, where the message can be read by the user.

In FIG. 2a, the left area 215 indicates that the user's mailbox includes four folders (Folder 1, Folder 2, Folder 3, and Folder 4). Each of these folders may include subfolders, message items, or both. In FIG. 2a, the folders have not been expanded or opened to reveal their contents. However, a subfolder indicia 230, such as a "+," is displayed next to Folder 1, Folder 2, and Folder 3 to indicate that these folders each contain subfolders. The lack of a "+" next to Folder 4 indicates that it does not contain subfolders. The presence of absence of a subfolder indicia does not indicate whether a folder contains individual message items.

If a folder contains subfolders, the user may expand or open the folder by selecting the subfolder indicia next to the folder or by double clicking on the folder icon or folder name. FIG. 2b illustrates the contents of the left area 215 after Folder 1 has been expanded. From the left area 215, the user can now see that Folder 1 includes two subfolders, Folder A and Folder B. The subfolder indicia indicates that Folder A includes subfolders, while the lack of subfolder indicia indicates that Folder B does not. Those skilled in the art will appreciate that the "−" next to Folder 1 is used in the Windows Explorer-like UI to indicate an expanded folder that includes subfolders.

As mentioned earlier, the present invention provides an efficient method for updating and displaying the data store hierarchy and subfolder indicia, which are displayed in the left area 215. An important advantage of the present invention is that it may be employed to retrieve sufficient information regarding the data store hierarchy to display subfolder indicia while also minimizing response time and the amount of network bandwidth required to transfer the data.

Figure 3:
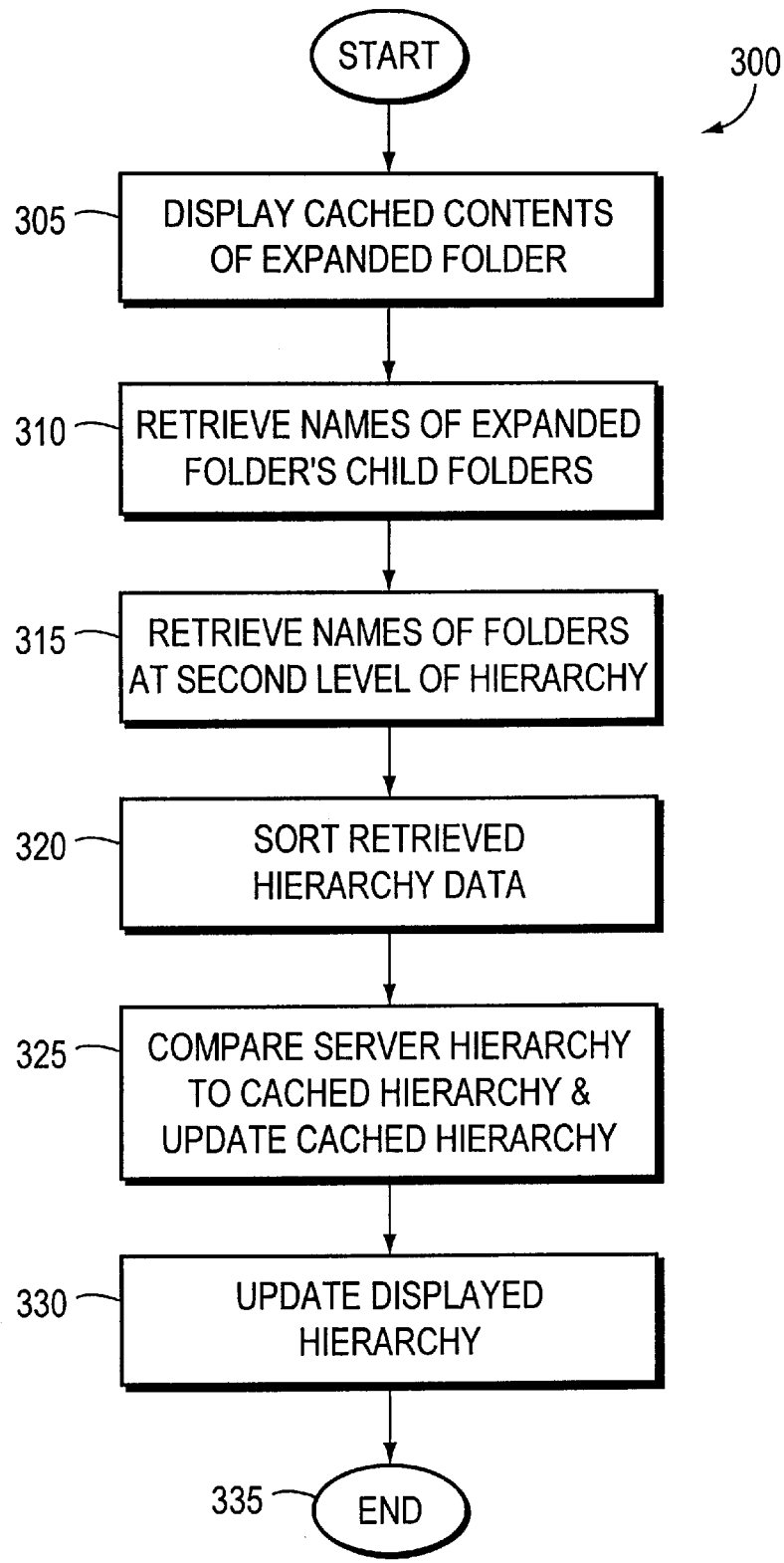
FIG. 3 is a flow diagram illustrating an exemplary method for updating and displaying the hierarchy of a remote data store.

FIG. 3 is a flow chart of an exemplary method 300 for updating and displaying the hierarchy associated with a message store that is stored on a remote mail server. Those skilled in the art will appreciate that the exemplary method is carried out by an e-mail client 37 (FIG. 1), such as the "MICROSOFT OUTLOOK" program, which is operative to communicate with a remote mail server 49 (FIG. 1). In this embodiment, the e-mail client, remote mail server, and message store implement the IMAP protocol and operate in what IMAP defines as the on-line mode.

The method 300 begins at step 305 when a user expands a folder (e.g., Folder 1 in FIG. 2a). At that point, the e-mail client reads a previously cached copy of the expanded folder's contents (e.g., from hard disk drive 27, FIG. 1) and displays the contents of the cached folder (e.g., Folder 1 in FIG. 2b). Those skilled in the art will appreciate that the use of a local, cached copy of previously retrieved hierarchy data is advantageous for several reasons. A local, cached copy of the hierarchy allows the e-mail client to provide a much better perceived response time by immediately displaying the cached hierarchy when a user expands a folder, and then verifying the accuracy of the cached data. This is acceptable because in most cases the cached data will be accurate and when it is not, the displayed data will be updated very quickly, as explained below. The use of cached data also allows the e-mail client to provide some off-line functionality. For example, the user can browse any folder and read any messages that have been downloaded before the computer was disconnected from the server.

Once the cached hierarchy data is read and displayed (in the left area 215, FIG. 2), the e-mail client retrieves two levels of hierarchy data from the remote mail server. At step 310 the e-mail client retrieves the names of all folders included in the folder being expanded. As used herein, the term "child folder" is used to refer to a folder that is included in the expanded folder. This retrieved data is used to synchronize child folders so that the displayed list of child folders matches the list from server.

In the IMAP protocol, the child folders are retrieved by using IMAP's LIST command. The LIST " " "<folder name>/% " command downloads the names of child folders of folder being expanded. Those skilled in the art will understand that the character "/" is a hierarchy delimiter that is used by many systems. However, some systems may use other characters, such as a "." or a "\". IMAP also uses characters known as wild cards. For example, the character "*" matches zero or more characters (including a hierarchy delimiter) in that position. The character "%" is similar to "*" but does not match a hierarchy delimiter.

At step 315 the e-mail client retrieves the second level of the hierarchy, which includes the subfolders of the expanded folder's child folders. This is accomplished using the LIST " " "<folder name>/%/%" command. This command downloads all folders at the second level of the hierarchy below folder being expanded. The resulting data is used to ensure that local copies of the child folders have correct information regarding the presence of subfolders.

At step 320, the retrieved data regarding the child folders and their subfolders is sorted and prepared for an alphabetic comparison to the cached hierarchy data.

At step 325 the sorted data is compared to the cached data and the cached data is updated to accurately reflect the current state of the message store hierarchy, which was retrieved from the mail server. This step, which is described in more detail in conjunction with FIG. 4, allows the e-mail client to determine which child folders should be displayed under the expanded folder, and whether each child folder contains subfolders of its own. It is this information that allows the e-mail client to determine whether subfolder indicia should be displayed next to each of the expanded folder's child folders.

After the cached data is updated, the e-mail client proceeds to step 330 and displays the updated hierarchy data (in the left area 215, FIG. 2). This may involve adding or deleting child folders and adding or deleting subfolder indicia from the displayed child folders.

Figure 4:
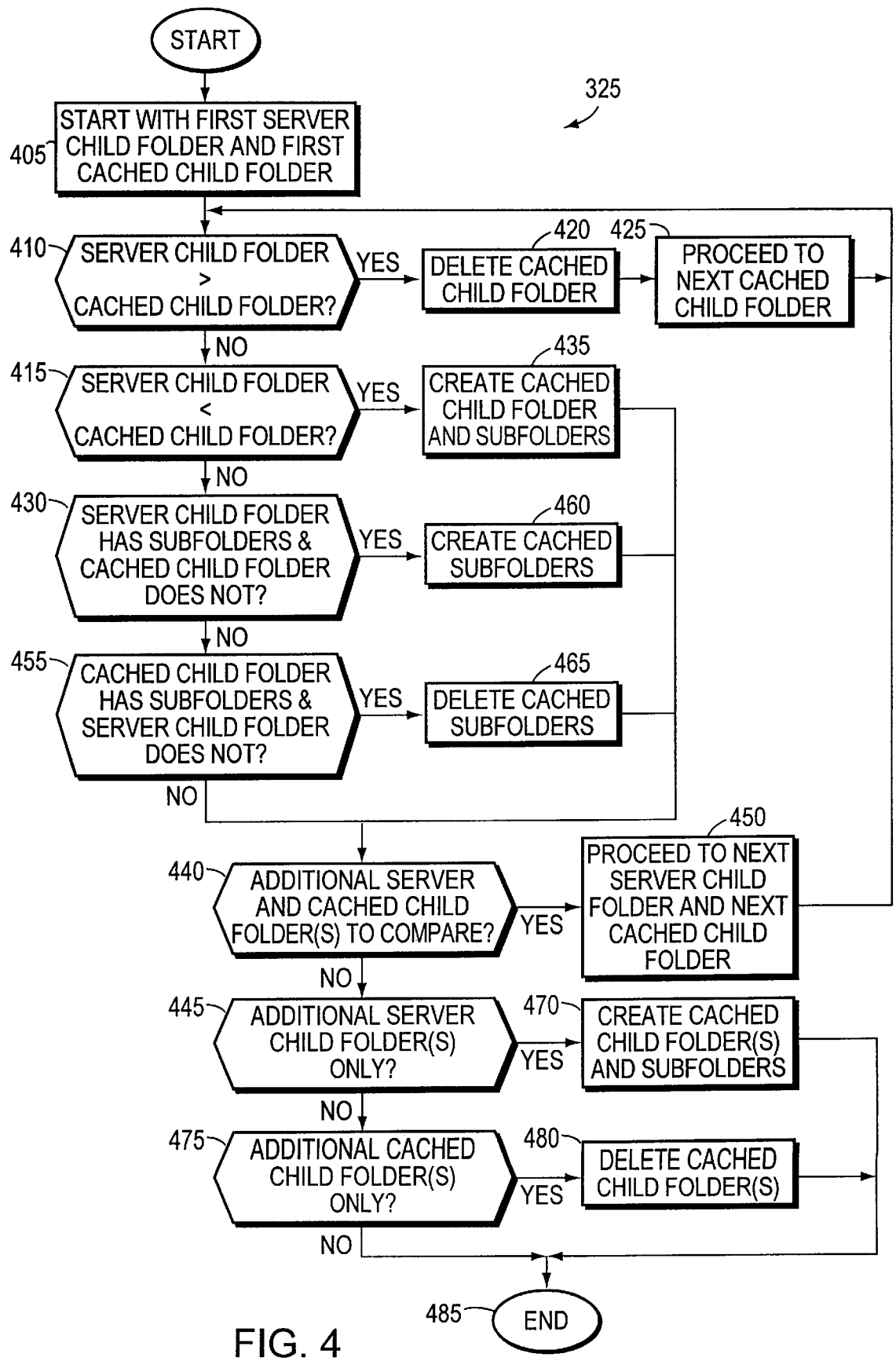
FIG. 4 is a flow diagram illustrating an exemplary method for comparing retrieved hierarchy data to cached hierarchy data and updating the cached hierarchy data, which forms a part of the method of FIG. 3.

FIG. 4 is a flow chart that illustrates an exemplary method 325 for comparing the retrieved data to the cached data and for updating the cached data. Those skilled in the art will appreciate that the disclosed method performs an alphabetic comparison of the retrieved server data to the cached data. The method is optimized to provide synchronization of child folders and accurate display of subfolder indicia, without performing any unnecessary synchronization of the child folders' subfolders. Those skilled in the art will understand that in an alphabetic comparison of folder names, a first folder name is "equal to" a second folder name if the names are identical. A first folder name is "less than" a second folder name if it comes before the second name. Similar, a first folder name is "greater than" a second folder name if it comes after the second folder name.

The first part of the process ensures that the cached list of the expanded folder's child folders matches the server's list of child folders. This is accomplished by working through the list of the child folders returned by the server and comparing them to the cached child folders.

The method 325 begins at step 405 by starting with the first server child folder and the first cached child folder in the sorted lists. At step 410 the e-mail client determines whether the server child folder is "greater than" the cached child folder. If not, the e-mail client proceeds to step 415. If so, this indicates that a child folder has been deleted from the server but is still present in the cache, and the e-mail client proceeds to step 420, where it deletes the old child folder and its subfolders from the cached hierarchy. From there, the e-mail client proceeds to step 425, where it looks at the next cached child folder, and returns to step 410, where it compares the server child folder to the next cached child folder.

At step 415 the e-mail client determines whether the server child folder is "less than" the cached child folder. If not, the e-mail client proceeds to step 430. If so, this indicates that a new child folder is present on the server but has not been added to the cache. The e-mail client then proceeds to step 435, where it adds the new child folder and its subfolders (if any) to the cached hierarchy.

From step 435, the e-mail client proceeds to step 440 and determines whether there are both additional server child folders and cached child folders to be compared. If there is at least one server child folder and at least one cached child folder left to compare, the e-mail client proceeds to step 450, where it looks at the next server child folder and the next cached child folder, and returns to step 410 where it compares the server child folder to the cached child folder. If there are not both server child folders and cached child folders to compare, the method proceeds to step 445, which is discussed below.

After executing steps 410 and 415, the e-mail client will proceed to step 430 only if the server child folder is "equal to" the cached child folder. At step 430, the e-mail client determines if the server child folder has at least one subfolder but the cache child folder does not. If this is not the case, the e-mail client proceeds to step 455. If this is the case, the e-mail client proceeds to step 460 and adds the missing subfolders to the cached child folder. This will allow the e-mail client to display subfolder indicia next to the child folder, where it previously did not. From step 460, the e-mail client proceeds to step 440 and determines whether there are both additional server child folders and cached child folders to be compared. If so, the e-mail client proceeds to step 450. If not, the method proceeds to step 445.

At step 455, the e-mail client determines if the server child folder has no subfolders but the cached child folder has at least one child folder. If this is not the case, the e-mail client proceeds to step 440. If this is the case, the e-mail client proceeds to step 465 and deletes the extra subfolders from the cached child folder. This will allow the e-mail client to remove previously displayed subfolder indicia from the child folder. From step 465, the e-mail client proceeds to step 440 and determines whether there are both additional server child folders and cached child folders to be compared. If so, the e-mail client proceeds to step 450. If not, the method proceeds to step 445.

At step 445, the e-mail client determines if there are only additional server child folders left to compare. If there are no additional server child folders, the e-mail client proceeds to step 475. If there are server child folders, the e-mail client proceeds to step 470 and creates the corresponding cached child folders and their subfolders (if any). From step 470, the method terminates at step 485 and returns to the method 300 (FIG. 3).

At step 475, the e-mail client determines if there are only additional cached child folders left to compare. If not, the e-mail client proceeds to step 485. If there are cached child folders, the e-mail client proceeds to step 480 and deletes the remaining cached child folders. From step 480, the method terminates at step 485 and returns to the method 300 (FIG. 3).

It will be appreciated that there are two conditions under which the e-mail client will proceed through steps 410, 415, 430, and 455 without altering the cached data. This will happen if the server child folder and cached child folder are identical and neither child folder contains a subfolder. It will also occur if both the server child folder and the cached child folder are identical and both contain at least one subfolder. In this second scenario, those skilled in the art will appreciate that the e-mail client need not perform any test to ensure that the server child folder and the cached child folder both include the same subfolders. At this point, the fact that they both contain at least one subfolder is sufficient to allow the e-mail client to accurately display a subfolder indicia next to the child folder. The process of synchronizing the contents of a subfolder may be postponed until the user expands one of the displayed subfolder. This optimization avoids the introduction of additional delay in the process.

In general, these steps may be summarized as follows. The comparison makes sure the cached list of child folders (of the expanded folder) matches the retrieved list. After that, the comparison includes the following steps. If a retrieved child folder has subfolders but the cached version does not, the subfolders are added to the cached data. If the retrieved child folder has no subfolders, but the cached version does, the cached subfolders are deleted. No additional steps are taken at this point if both the retrieved child folder and the cached child folder have children, or if neither the retrieved child folder or the cached child folder have children.

The method of FIG. 4 may be illustrated by way of the following example. In this example, the user expands a folder (the "expanded folder"). The e-mail client displays the cached contents of the expanded folder, retrieves from the server the child folders of the expanded folder and the subfolders of the child folders, and compares the retrieved data to the cached data. The server contents and cached contents of the expanded folder are displayed below in Table I:

TABLE I

| Server List Expanded Folder | Cached List Expanded Folder |
|---|---|
| Child Folder 1 | Child Folder 1 |
| Subfolder A | Subfolder A |
| Subfolder C | Subfolder B |
| Child Folder 2 | |
| Subfolder D | |
| Child Folder 3 | Child Folder 3 |
| Subfolder E | |
| | Child Folder 4 |
| | Subfolder F |
| Child Folder 5 | Child Folder 5 |
| | Subfolder G |

In this example, both lists include Child Folder 1 and both lists indicate that Child Folder 1 includes at least one subfolder. This will result in the e-mail client proceeds through steps 410, 415, 430, and 455 without taking any further action. The e-mail client is able to accurately display a subfolder indicia next to Child Folder 1 even though the lists include different subfolders. At step 440 the e-mail client will determine that there are more server child folders to compare, and step 450 will focus the comparison on the next server child folder (Child Folder 2) and the next cached child folder (Child Folder 3).

When the e-mail client is comparing server Child Folder 2 to cached Child Folder 3 at step 415, it will determine that the server includes a child folder that is not present in the cache list. At that point, the e-mail client will proceed to step 435 and add Child Folder 2 and Subfolder D to the cached list. At step 440 the e-mail client will determine that there are more server child folders to compare, and step 450 will focus the comparison on the next server child folder (Child Folder 3) and the next cached child folder (Child Folder 3, which is after the newly created Child Folder 2).

When the e-mail client is comparing server Child Folder 3 to cached Child Folder 3 at step 430, the e-mail client will determine that the server child folder includes at least one subfolder, while the cached child folder does not include any. The e-mail client will proceed to step 460 and add Subfolder E to the cached list. At step 440 the e-mail client will determine that there are more server child folders to compare, and step 450 will focus the comparison on the next server child folder (Child Folder 5) and the next cached child folder (Child Folder 4).

When the e-mail client compares server Child Folder 5 to cached Child Folder 4 at step 410, the e-mail client will determine that the server child folder is "greater than" the cached child folder. The e-mail client will then go to step 420 and delete Child Folder 4 and its contents from the cached list. At step 425 the e-mail client will prepare to compare the next cached child folder (Child Folder 5) to the present server child folder (Child Folder 5).

When the e-mail client compares server Child Folder 5 to cached Child Folder 5 at step 455, it will determine that the cached child folder has subfolders while the server child folder does not. The e-mail client will proceed to step 465 and delete Subfolder G from the cached list. At step 440, the e-mail client will determine that there are no more server child folders to compare and the method 325 will terminate.

Once the cache list is updated, the displayed hierarchy is updated so that it includes an accurate listing of the child folders and appropriate subfolder indicia.

REVIEW OF THE DETAILED DESCRIPTION

From the foregoing description, it will be appreciated that the present invention provides an improved method for updating and displaying the hierarchy of a remote data store. In the described embodiment, the method responds to a user expanding a folder by first displaying a cached list of the expanded folder's contents. After the cached data is displayed, a list of the expanded folder's child folders and a list of the subfolders contained in the child folders are retrieved from the data store. The retrieved data is sorted and compared to the cached list, and the cached data is updated to reflect the correct child folders and whether the child folders contain subfolders. The displayed hierarchy is then updated to reflect the retrieved data. This method is advantageous because it may be employed to efficiently download sufficient information to maintain accurate information regarding subfolders and to allow efficient traversal of an IMAP hierarchy using a Windows Explorer-style user interface.

Unlike prior art e-mail clients, an embodiment of the present invention downloads only two levels of hierarchy beneath the expanded folder. A first list command is used to download the names of all child folders of the folder being expanded. The results of this command are used to synchronize the names of the displayed child folders so that the displayed folder list exactly matches the folder list that was returned by the server. A second list command downloads all folders at the second level of the hierarchy below the folder being expanded. The resulting list is used to ensure that local copies of the child folders reflect the correct state regarding the presence or absence of subfolders of their own, which allows subfolder indicia to be displayed where appropriate.

The invention may conveniently be implemented in one or more program modules that are based upon and implement the features illustrated in FIGS. 2–4. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes. In addition, although the invention was described in the context of a e-mail client, mail server, and message store, that implement the Internet Message Access Protocol, those skilled in the art will appreciate that the invention is applicable to remote servers that include other types of data stores, message stores, and file stores, and in other operating environments.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In a system including a local computer, a remote server, a network linking the local computer and the remote server and a data store residing on the remote server, the data store including a server folder having server child folders, each of which includes zero or more server subfolders, a method for retrieving and displaying the contents of the server folder, comprising the steps of:

receiving at the local computer an indication to expand the server folder;

in response to the indication to expand the server folder, displaying at the local computer a cached folder, which is stored by the local computer and which corresponds to the server folder, and cached child folders included in the cached folder, the cached child folders each including zero or more cached subfolders;

receiving at the local computer a limited download from the remote server of folder hierarchy information about the server folder that includes the server child folders and the server subfolders, the limited download enabling the local computer to display subfolder indicia in a manner that minimizes execution time and use of network bandwith;

updating the cached child folders to correspond to the server child folders;

displaying at the local computer the server child folders; and displaying at the local computer the subfolder indicia in association with the server child folders that include at least one server subfolder.

2. The method of claim 1, wherein updating the cached child folders comprises the steps of:

determining whether the cached child folders include an old child folder not included in the server child folders;

in response to the cached child folders including an old child folder not included in the server child folders, deleting the old child folder from the cached child folders;

determining whether the server child folders include a new child folder not included in the cached child folders; and in response to the server child folders including a new child folder not included in the cached child folders, adding the new child folder to the cached child folders.

3. The method of claim 2, further comprising the steps of:

determining whether the new child folder includes at least one server subfolder; and in response to the new child folder including at least one server subfolder, adding the at least one server subfolder to the cached new child folder.

4. The method of claim 1, wherein updating the cached child folders comprises the steps of:

identifying a selected server child folder and a selected cached child folder, the selected cached child folder corresponding to the selected server child folder;

determining whether the selected server child folder includes at least one server subfolder;

determining whether the selected cached child folder includes at least one cached subfolder;

in response to the selected server child folder including at least one server subfolder and the selected cached child folder not including at least one cached subfolder, adding to the selected cached child folder the at least one server subfolders included in the selected server child folder; and in response to the selected cached child folder including at least one cached subfolder and the selected server child folder not including at least one server subfolder, deleting the at least one cached subfolder from the selected cached child folder.

5. In a messaging system including a remote message store residing on a remote mail server, the message store including a server folder having zero or more server child folders, each of which includes zero or more server subfolders, a method for displaying the contents of the server folder on a client computer networked to the remote mail server, comprising the steps of:

receiving at the client computer an indication to expand the server folder;

in response to the indication to expand the server folder, reading at the client computer a cached folder corresponding to the server folder, zero or more cached child folders belonging to the cached folder, and zero or more cached subfolders belonging to the cached child folders;

displaying at the client computer the cached folder and the zero or more cached child folders;

receiving at the client computer a limited download from the remote mail server of folder hierarchy information about the server folder that includes the server child folders and the server subfolders; the limited download enabling the client computer to display subfolder indicia in a manner that minimizes execution time and use of network bandwidth;

updating the cached child folders to correspond to the server child folders;

displaying at the client computer the server child folders; and displaying at the client computer subfolder indicia in association with at least one server child folder.

6. The method of claim 5, wherein updating the cached child folders comprises the steps of:

determining whether the cached child folders include an old child folder not included in the server child folders;

in response to the cached child folders including an old child folder not included in the server child folders, deleting the old child folder from the cached child folders;

determining whether the server child folders include a new child folder not included in the cached child folders; and in response to the server child folders including a new child folder not included in the cached child folders, adding the new child folder to the cached child folders.

7. The method of claim 6, further comprising the steps of:

determining whether the new child folder includes at least one server subfolder; and in response to the new child folder including at least one server subfolder, adding the at least one server subfolder to the cached new child folder.

8. The method of claim 5, wherein updating the cached child folder comprises the steps of:

identifying a selected server child folder and a selected cached child folder, the selected cached child folder corresponding to the selected server child folder;

determining whether the selected server child folder includes at least one server subfolder;

determining whether the selected cached child folder includes at least one cached subfolder;

in response to the selected server child folder including at least one server subfolder and the selected cached child folder not including at least one cached subfolder, adding to the selected cached child folder the at least one server subfolders included in the selected server child folder; and in response to the selected cached child folder including at least one cached subfolder and the selected server child folder not including at least one server subfolder, deleting the at least one cached subfolder from the selected cached child folder.

9. The method of claim 5, further comprising the step of determining whether at least one server child folder includes server subfolders and wherein the subfolder indicia are displayed in association with server child folders that include server subfolders.

10. A computer-readable medium having computer executable instructions for performing steps comprising:

creating a cached folder corresponding to a server folder on a remote data store located on a remote server, the server folder including server child folders, the server child folders each including zero or more server subfolders, the cached folder including cached child folders, the cached child folders each including zero or more cached subfolders;

storing the cached folder on a local computer networked to the remote server;

receiving at the local computer an indication to expand the server folder;

displaying at the local computer the cached folder and the cached child folders;

receiving at the local computer a limited download from the remote server of folder hierarchy information about the server folder that includes the server child folders and the server subfolders; the limited download enabling the local computer to display subfolder indicia for the server child folders in a manner that minimizes execution time and use of network bandwidth;

updating the cached child folders to correspond to the server child folders;

displaying the server child folders and the subfolder indicia in association with server child folders that include one or more server subfolders.

11. The computer-readable medium of claim 10, wherein updating the cached child folders includes performing steps comprising:

determining whether the cached child folders include an old child folder not included in the server child folders;

in response to the cached child folders including an old child folder not included in the server child folders, deleting the old child folder from the cached child folders;

determining whether the server child folders include a new child folder not included in the cached child folders;

in response to the server child folders including a new child folder not included in the cached child folders, adding the new child folder to the cached child folders;

identifying a selected server child folder and a selected cached child folder, the selected cached child folder corresponding to the selected server child folder;

determining whether the selected server child folder includes at least one server subfolder;

determining whether the selected cached child folder includes at least one cached subfolder;

in response to the selected server child folder including at least one server subfolder and the selected cached child folder not including at least one cached subfolder, adding to the selected cached child folder the at least one server subfolders included in the selected server child folder; and in response to the selected cached child folder including at least one cached subfolder and the selected server child folder not including at least one server subfolder, deleting the at least one cached subfolder from the selected cached child folder.

12. The computer-readable medium of claim 11, wherein the instructions are further operative to performs the steps of:

determining whether the new child folder includes at least one server subfolder; and in response to the new child folder including at least one server subfolder, adding the at least one server subfolder to the cached new child folder.

13. A computer-readable medium having computer-executable instructions for performing steps comprising:

displaying at a client machine cached content stored on the client machine of a folder residing on a remote mail server in response to receiving at the client machine an indication to expand the folder;

receiving at the client machine a limited download from the remote mail server of folder hierarchy information about the folder, the limited download sufficient to enable the client machine to display accurate subfolder indicia for subfolders revealed by expansion of the folder in a manner that minimizes execution time and use of network bandwith;

updating a hierarchy of the cached content in response to comparing the limited download of folder hierarchy information with the hierarchy of the cached content; and displaying at the client machine the updated hierarchy of the cached content.

14. The computer-readable medium of claim 13, wherein the step of receiving at the client machine a limited download from the remote mail server comprises:

retrieving the names of all folders included at a first level of hierarchy content of the expanded folder; and retrieving the names of all folders included in a second level of hierarchy content of the expanded folder.

15. The computer-readable medium of claim 14, wherein the instructions are further operative to perform the step of sorting the first level of hierarchy content and the second level of hierarchy content in an alphabetic order.

16. The computer-readable medium of claim 14, wherein the step of retrieving the first level of hierarchy content comprises retrieving child folders of the expanded folder by using the IMAP command LIST" " "<folder name>/%" command to download from the remote mail server the names of the child folders.

17. The computer-readable medium of claim 16, wherein the step of retrieving the second level of hierarchy content comprises retrieving the subfolders for the child folders by using the IMAP command LIST" " "<folder name>/%/%" command to download from the remote mail server the names of the subfolders.

18. The computer-readable medium of claim 13, wherein the step of receiving at the client machine a limited download from the remote mail server comprises receiving names of child folders for the expanded folder and receiving names of subfolders of the child folders for the expanded folder.

19. The computer-readable medium of claim 18, wherein the step of updating the hierarchy of the cached content comprises:

determining which child folders should be displayed at the client machine under the expanded folder; and determining whether each child folder contains zero or more subfolders.

20. The computer-readable medium of claim 19, wherein the computer-executable instructions further comprise the step of determining whether a subfolder indicia should be displayed at the client machine next to each of the child file folders for the expanded folder.

21. A computer-implemented method for displaying on a local computer networked to a remote server a hierarchy of a server folder located on the remote server, comprising the steps of:

receiving at the local computer an indication to expand a folder of the hierarchy containing a first subfolder; and in response to receiving the indication, receiving at the local computer a limited download of the hierarchy from the remote server sufficient to enable the local computer to determine if the first subfolder contains a second subfolder;

displaying the first subfolder;

determining if the first subfolder contains the second subfolder; and if the first subfolder contains the second subfolder, displaying a subfolder indicator proximate to the first subfolder.

22. A computer-readable medium having computer-executable instructions for performing the method of claim 21.

\* \* \* \* \*